May 26, 1970     R. C. WOLF ET AL     3,514,013
RUPTURE PORT SLEEVES
Filed July 26, 1968
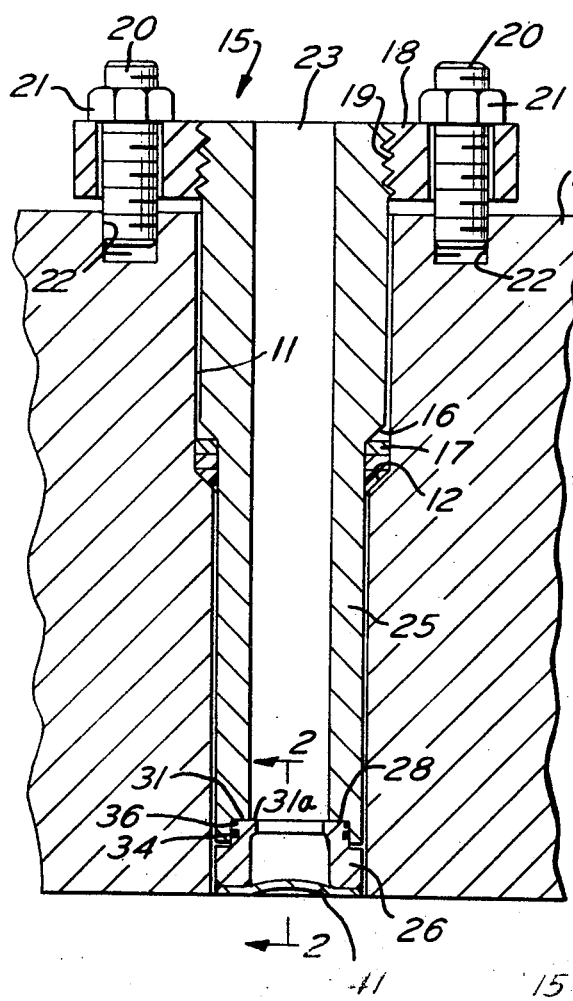
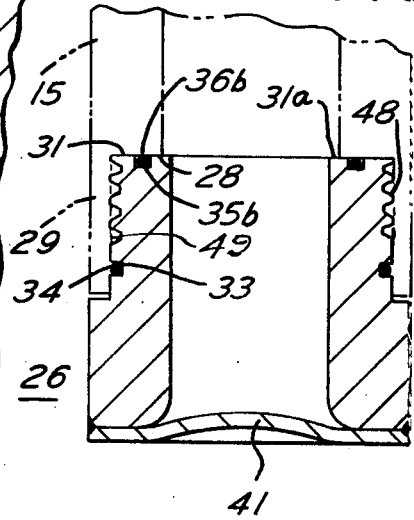
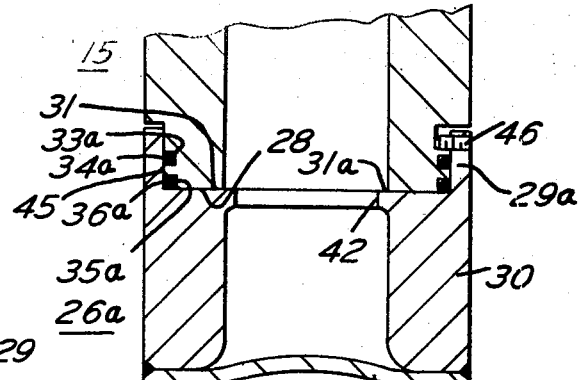
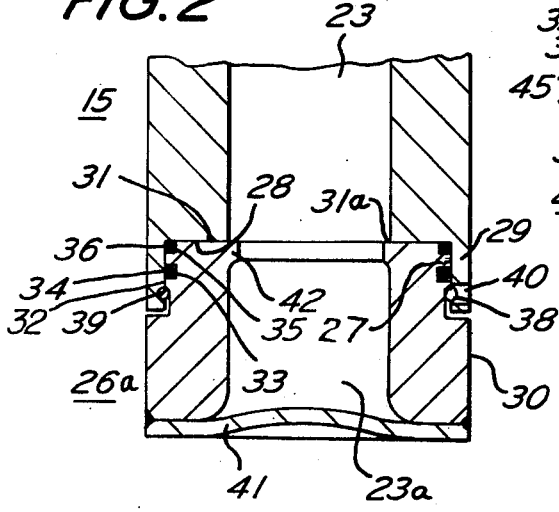
INVENTORS
ROBERT C. WOLF
RUSH B. GUNTHER
BY B. T. Wobensmith
ATTORNEY

United States Patent Office

3,514,013
Patented May 26, 1970

3,514,013
RUPTURE PORT SLEEVES
Robert C. Wolf, Hatboro, and Rush B. Gunther, Abington, Pa., assignors, by mesne assignments, to The Duriron Company, Inc., Dayton, Ohio, a corporation of New York
Filed July 26, 1968, Ser. No. 748,055
Int. Cl. B65d 25/00, 17/00; F17b 1/14; F17c 13/06
U.S. Cl. 220—89                                     9 Claims

ABSTRACT OF THE DISCLOSURE

A rupture port sleeve is provided having a removable end portion on which a pressure rupturable disc is carried, the end portion being retained in place and having seals. The end portion has an internal shoulder to facilitate removal.

BACKGROUND OF THE INVENTION

Field of the invention

This invention relates to rupture port sleeves and more particularly to an improved rupture port sleeve end construction.

Description of the prior art

It has heretofore been proposed to employ rupture port sleeves on high pressure vessels in the process industries with pressure ranges from 20,000 to 60,000 p.s.i. and at temperatures of 300° to 600° F.

Upon the occurrence of a rupture of the disc it has heretofore been the practice to return the rupture port sleeve to the manufacturer for repair by replacement of the ruptured disc. Such sleeves are long and heavy and are often employed at locations very distant from the manufacturer. The return of the sleeve involves time delays as well as high costs for transportation.

No other satisfactory provisions have heretofore been made to overcome the problems now encountered in connection with the replacement of the discs.

SUMMARY OF THE INVENTION

In accordance with the invention the rupture port sleeve is provided with a removable end portion on which a pressure rupturable disc is carried with provisions for retaining the end portion in place and with simple but effective sealing against leakages. Provisions are also made to facilitate removal of the end portion, if desired.

It is the principal object of the present invention to provide a rupture port sleeve which can be quickly and easily made ready for reuse in the event of rupture of the disc.

It is a further object of the present invention to provide a rupture port sleeve with a replaceable end portion capable of easy removal and reassembly for installation at the plant where it is used.

It is a further object of the present invention to provide a removable end portion for a rupture port sleeve which will reduce the overall cost of operation and replacement.

It is a further object of the present invention to provide a removable end portion for a rupture port sleeve which is simple in construction, reliable in use, and which by reason of its size, can be made of more expensive materials having special characteristics without greatly increasing the cost of the sleeve assembly.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 1 is a fragmentary sectional view of a portion of the wall of a high pressure vessel having a rupture port sleeve in accordance with the invention mounted therein, the sleeve also being shown in longitudinal central section;

FIG. 2 is an enlarged longitudinal central sectional view of the inner end of the rupture port sleeve shown in FIG. 1;

FIG. 3 is a view similar to FIG. 2 showing a modified form of the invention; and FIG. 4 is a view similar to FIG. 2 showing a further modified form of the invention.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to FIGS. 1 and 2 of the drawings, the wall of a pressure vessel is shown at 10, with an opening 11 through the wall communicating with the interior of the pressure vessel. The opening 11 has a shoulder 12 intermediate its ends.

The rupture port sleeve shown generally at 15 preferably has an exterior shoulder 16 for engagement with packing 17 of Teflon or the like, which engages shoulder 12 to provide a seal effective at high temperatures of the order of 600° F. and above. The sleeve 15 is retained in place by a flange 18 removably engaged therewith by a threaded connection 19. A plurality of studs 20 with nuts 21 thereon engage the flange 18 and extend into threaded openings 22 in the wall 10. The sealing by the packing 17 can be adjusted by the nuts 21. The sleeve 15 has a central relief opening 23 communicating with the atmosphere.

The rupture port sleeve 15 has an elongated body portion 25 and removably connected thereto, as hereinafter explained, an end portion or rupture nose 26.

In the embodiment of the invention illustrated in FIGS. 1 and 2, the body portion 25 has a counter bore 27 extending inwardly from its inner end terminating at a shoulder 28 and providing an annular flange 29.

The end portion 26 has an outer surface 30 aligned with the exterior of the body portion 25, an end shoulder 31 for engagement with the shoulder 28 and an inner circumferential face 32 extending from the end shoulder 31.

The circumferential face 32 has, intermediate its ends, an intermediate circumferential groove 33 for the reception of a primary sealing ring 34, such as an O-ring, preferably of Teflon or other material capable of sealing at the temperature and pressure levels previously referred to, and which engages the counterbore 27.

The circumferential face 32 has an end circumferential groove 35 for the reception of a secondary sealing ring 36, such as an O-ring, and like sealing ring 34 preferably of Teflon or other suitable material, and engaging the shoulder 28 and the counter bore 27.

The end portion or rupture nose 26 is held in place in any desired manner. One suitable form of securing is by the insertion, in an annular grove 38 common to both the flange 29 and the rupture nose 26, of a short length of cable 39 such as that employed for speedometer actuation and consisting of a central wire core with a wound helical wire enclosure. The cable 39 preferably extends through about 330° and is removable and insertable through a slot 40 communicating with the groove 38.

The rupture nose 26 at the end thereof has a rupture disc 41, preferably of metal, secured thereto in any desired manner with a central relief opening 23a in continuous communication with the opening 23. The opening 23a is closed by the disc 41. The disc 41 is adapted to rupture when the pressure and/or temperature limits for which it is designed are exceeded, for relief of the interior of the vessel to atmosphere.

In order to facilitate the separation of the rupture nose 26 from the body portion 25, and to which it may be adherent after use, the rupture nose is provided with an interior flange 42 which provides a shoulder portion 31a as an extension of the shoulder 31 and against which a force or impact may be applied.

In the embodiment of the invention shown in FIG. 3 the rupture nose 26a has a flange 29a thereon in surrounding relation to a circumferential face 45 on the elongated body portion 25. The face 45 has an intermediate groove 33a for a primary packing ring 34a and a groove 35a for a secondary packing ring 36a, similar to the grooves 33 and 35 and packing 34 and 36.

Another form of securing structure is shown in FIG. 3 and comprises a plurality of radially extending set screws 46 mounted in the rupture nose 26 and engaging the body portion 25.

In the embodiment of the invention shown in FIG. 4, which is for use where the rupture nose 26 is not secured to the body portion 25 such as by cable 39 or set screws 46, and where the rupture nose 26 tends to adhere in the opening 11 to the wall 10, the rupture nose 26 can have threads 48 on the exterior thereof contacting a smooth internal bore 49 in the body portion 25 and the secondary seal is provided by a sealing ring 36b in a groove 35b on the shoulder 31.

When removal of the separated but adherent rupture nose 26 is desired, a tool 50 can be employed having a head 51 with internal threads 52 complemental to the threads 48 which can be secured to the rupture nose threads 48 for manipulation of its shank 53 for such removal.

It will be noted that the body portion 25 and rupture nose have a flange 29 or 29a exposed to the pressure within the vessel so as to aid in retaining these elements in engagement. The action of the primary seals provided by sealing rings 34 or 34a is aided by the pressure in the vessel exteriorly applied on the flanges 29 or 29a and the action of the secondary seals provided by the sealing rings 36, 36a or 36b is aided by the pressure in the vessel longitudinally applied on the rupture disc 41.

We claim:

1. A rupture port sleeve for removable mounting in the wall of a pressure vessel comprising:

an elongated sleeve portion having a longitudinal interior opening and a transverse end shoulder, a rupture nose end portion extending from said sleeve portion and having a rupture disc secured thereto for subjection to the pressure within the vessel and a transverse end shoulder in engagement with the transverse shoulder of said sleeve portion, one of said portions having a longitudinal flange with an inner face in longitudinal slidable overlapping relation to a longitudinal face on the other of said portions and for subjection to the pressure within the vessel, and one of said portions having sealing means thereon engaging said inner face.

2. A rupture port sleeve as defined in claim 1 in which:
securing means is provided in engagement with both said portions for retaining said rupture nose end portion in position on said sleeve portion.

3. A rupture port sleeve as defined in claim 1 in which said flange is integral with said sleeve portion.

4. A rupture port sleeve as defined in claim 1 in which said flange is integral with said rupture nose end portion.

5. A rupture port sleeve as defined in claim 1 in which said sealing means includes a primary sealing member in engagement with the interior of said flange.

6. A rupture port sleeve as defined in claim 1 in which said sealing means includes a secondary sealing member in engagement with said end shoulders.

7. A rupture port sleeve as defined in claim 1 in which said rupture nose end portion has a removal facilitating portion.

8. A rupture port sleeve as defined in claim 7 in which said last portion includes an inward projection.

9. A rupture port sleeve as defined in claim 7 in which said last portion includes external threads for removal tool attachment.

References Cited
UNITED STATES PATENTS

| | | |
|---|---|---|
| 328,008 | 10/1885 | Conner et al. |
| 2,692,066 | 10/1954 | Conrad. |
| 3,018,127 | 1/1962 | Dobrosielski et al. |
| 3,093,151 | 6/1963 | Merkowitz _____ 137—68 |
| 3,109,555 | 11/1963 | Samans. |
| 3,402,691 | 9/1968 | Rodgers _____ 137—68 |

RAPHAEL H. SCHWARTZ, Primary Examiner